UNITED STATES PATENT OFFICE.

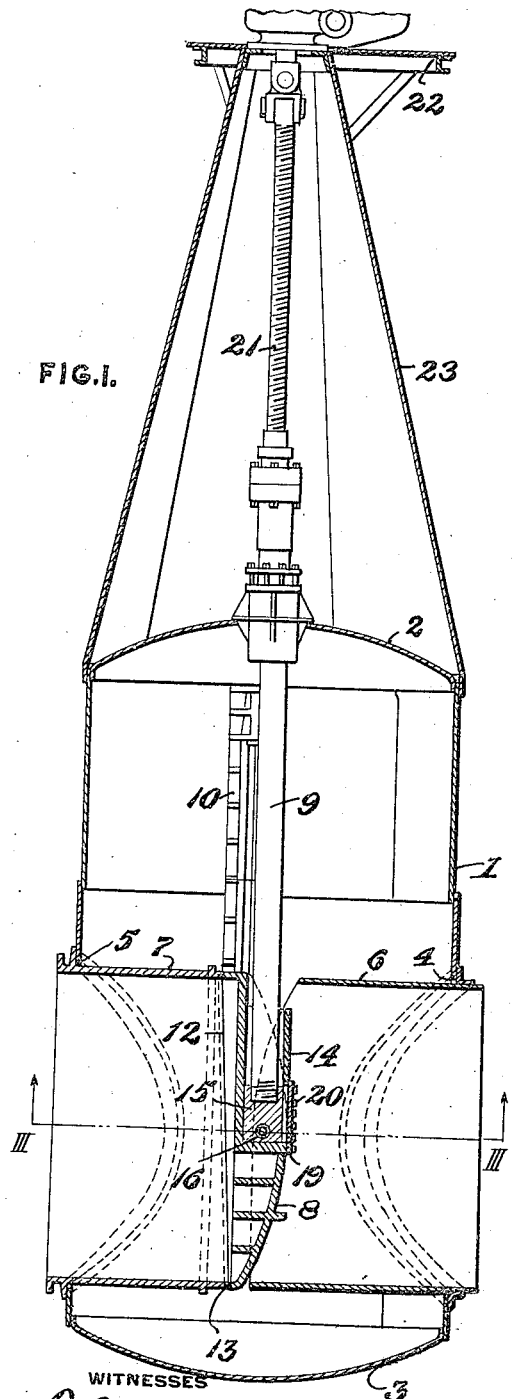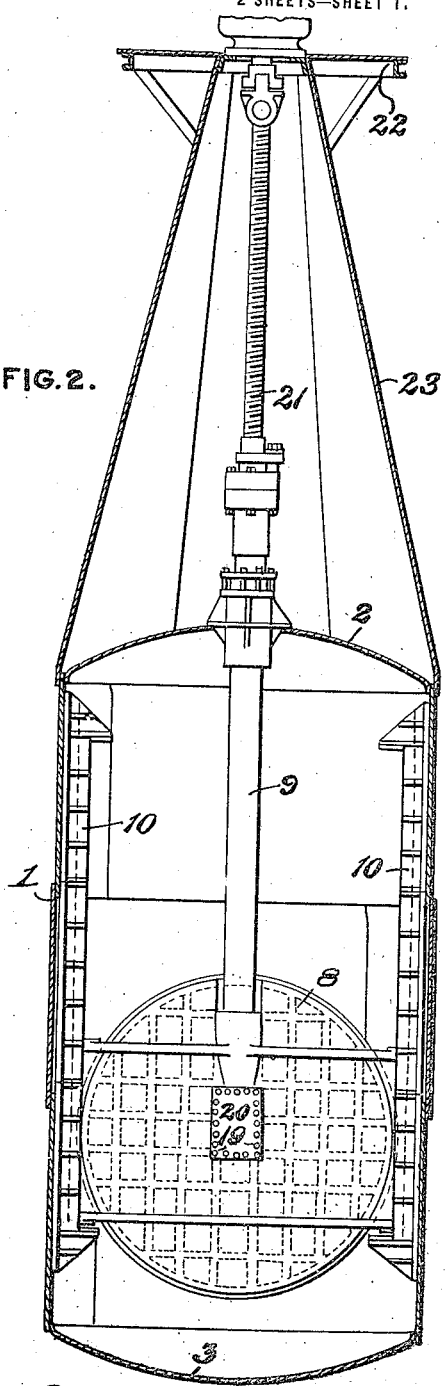

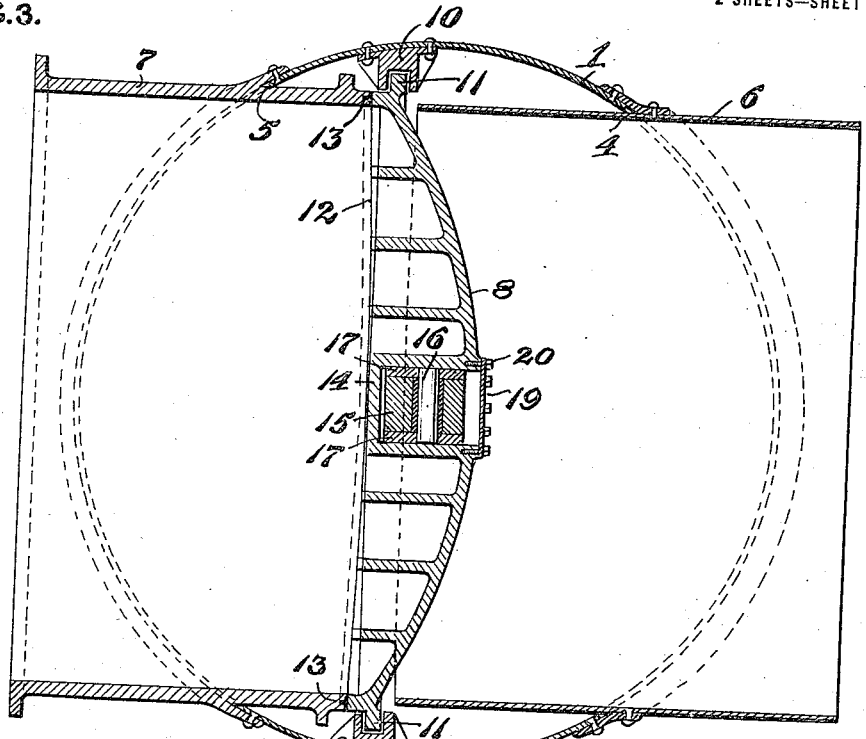
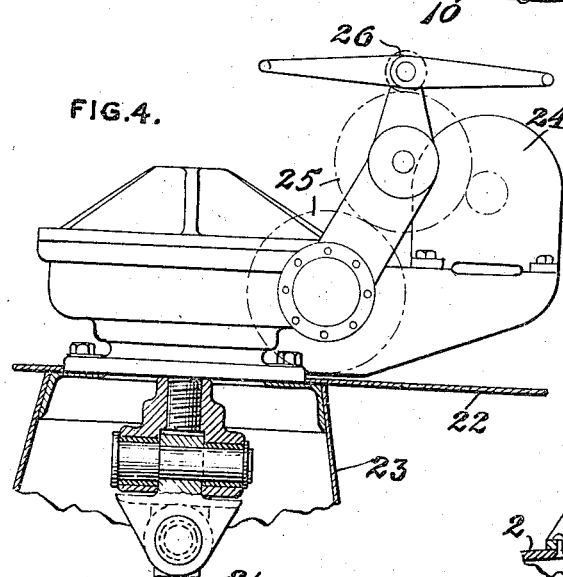
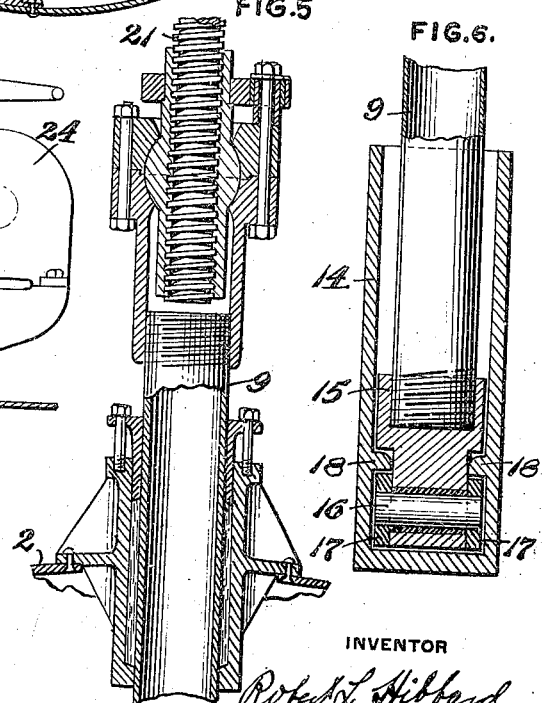

ROBERT L. HIBBARD, OF SEWICKLEY, PENNSYLVANIA, ASSIGNOR TO RITER-CONLEY MANUFACTURING COMPANY, OF PITTSBURGH, PENNSYLVANIA, A CORPORATION OF NEW JERSEY.

GATE-VALVE.

1,243,736.   Specification of Letters Patent.   Patented Oct. 23, 1917.

Application filed October 16, 1913. Serial No. 795,472.

*To all whom it may concern:*

Be it known that I, ROBERT L. HIBBARD, a citizen of the United States, residing at Sewickley, in the county of Allegheny and State of Pennsylvania, have invented certain new and useful Improvements in Gate-Valves, of which the following is a specification.

The prime object of my invention is to provide a new and improved gate valve, particularly designed for large capacity work.

In the accompanying drawing, which illustrates an application of my invention,

Figure 1 is a vertical sectional view of a gate valve constructed in accordance with my invention;

Fig. 2, a view similar to Fig. 1 taken at right angles thereto;

Fig. 3, a horizontal sectional view taken on line III—III of Fig. 1;

Fig. 4, a part elevational and a part sectional view of the valve actuating mechanism;

Fig. 5, a detailed vertical sectional view of the upper end of the valve stem and screw operating mechanism connected therewith; and, Fig. 6, a similar view of the lower end of the valve stem and its connection with the gate.

A characteristic and important feature of the present invention resides in the form of valve casing or housing employed; said casing preferably being constructed of boiler plate and in appearance resembling a huge boiler.

As illustrated and as preferred, the casing 1 is cylindrical in shape and has its upper and lower ends closed respectively by plate member 2 and 3. The casing is formed with diametrically opposed openings 4 and 5 through which fluid inlet and outlet pipes or conduits 6 and 7 are entered. These pipes project for a considerable distance within the interior of the casing, as particularly shown by Fig. 1, and interposed between the ends thereof is the gate 8. Gate 8 is vertically movable within the casing and transversely of the fluid pipes or conduits by means of the valve stem 9 and the valve actuating mechanism, hereinafter referred to, connected therewith.

Located interiorly of the casing and extending longitudinally thereof, I provide guide members 10, said members being adapted to receive projections 11 extending outwardly from the gate 8. The valve gate 8 is designed to be seated on an inclined valve seat 12 formed on an end of the outlet pipe 5, and in practice, I prefer to employ a bronze wear strip as 13.

The gate 8 is preferably of the construction shown and comprises a member bulged away from the seat face to provide a convex surface in the path of the fluid when the gate is in its closed position, the general configuration of this face being somewhat similar to a portion of a sphere. This enables the construction of a valve of light weight compared with its size by reason of the fact that the wall may be comparatively thin and supported by webs extending from the opposite side of the valve. As shown in the drawings, these webs are not connected on the outlet side of the valve so that the gate is practically a shell with one side (the inlet side) closed, the webs being sufficient to support the wall against the pressure, the particular shape of the wall face exposed to the pressure aiding in this respect. As shown, the portion of the gate coacting with the seat 12 is preferably annular, thus decreasing the weight of the gate. In addition, the gate is formed with a centrally disposed compartment 14 in which is located an internally threaded plug 15, said plug being secured within the compartment by means of a pin 16 and nuts or washers 17, the latter being designed to coact with inwardly projecting lugs 18 formed on the walls of compartment 14. As particularly illustrated by Fig. 6, the lower end of valve stem 9 is screwed into plug 15, and 19 designates a cap plate secured to the walls of the compartment 14 by means of bolts 20.

The manner of connecting the upper end of the valve stem with an actuating screw 21 is particularly shown by Fig. 6, and the drive arrangement in Fig. 4. The screw driving means form no part of the present invention, but, as illustrated, said means are located on a platform 22 supported by a housing 23, and may include a motor 24 and intermediate gearing 25, or said intermediate gearing may be actuated by the hand operating wheel 26.

As will be seen, the gate seats only on its outlet side, the conduit 6 being cut away to permit of the vertical movement of the gate, but the particular shape of the inlet side of the gate is such as to leave the casing above the conduits in open communication with the inlet conduit when the gate is closed, the result being that there is no sudden inflow of fluid into the casing at this point when the valve is being opened. Since this portion of the casing is necessarily filled with fluid, the opening of the gate will not cause violent movements of the fluid therein during the opening of the gate, especially movements which might tend to affect the structure or provide damage to the gate itself, the shape of the gate lending itself in producing this result.

What I claim is:

1. A gate structure adapted for mains of large diameter comprising a casing having opposing inlet and outlet fluid pipes axially alined and a chamber above said pipes, said outlet pipe having a gate seat inclined to the plane of travel of the gate, a gate vertically movable within the casing between said pipes and having a portion adapted to coact with said seat to close the structure, said gate having a central valve stem receiving compartment, a relatively thin wall to oppose the fluid, and ribs leading from the seating side of the gate, said inlet pipe being open to the chamber when the gate is closed.

2. A gate valve structure adapted for mains of large diameter comprising a cylindrical casing formed of sheet or plate material having its ends closed by curved plate members and having diametrically opposed openings, inlet and outlet pipes entered in said openings, said outlet pipe having a gate seat inclined to the plane of travel of the gate, a gate vertically movable within the cylindrical casing between said pipes, said casing providing a cylindrical chamber above and below said pipes, said inlet pipe being open to the chamber above said pipes when the gate is closed.

3. A gate structure adapted for mains of large diameter comprising a casing having opposing inlet and outlet fluid pipes axially alined, said outlet pipe having a gate seat inclined to the plane of travel of the gate, a gate vertically movable within the casing between said pipes and free from guiding engagement with said seat, said gate having an annular portion adapted to coact with said seat to close the structure, and a curved reinforced face to oppose the flow of fluid, said inlet pipe being open to the casing when the gate is closed.

4. A gate structure adapted for mains of large diameter comprising a casing having opposing inlet and outlet fluid pipes axially alined, said outlet pipe having a gate seat inclined to the plane of travel of the gate, a gate vertically movable within the casing between said pipes and having a portion adapted to coact with said face to close the structure, said gate being of shell form and reinforced by intersecting ribs on its seating face, said gate having a centrally disposed valve-stem receiving compartment, means for securing a stem within the compartment, said inlet pipe being open to the casing when the gate is closed.

5. A gate structure adapted for mains of large diameter comprising a casing having opposing inlet and outlet fluid pipes axially alined, said outlet pipe having a gate seat inclined to the plane of travel of the gate, a gate vertically movable within the casing between said pipes and having a portion adapted to coact with said seat to close the structure, said gate having its inlet face approximately convex, said inlet pipe being open to the casing when the gate is closed.

6. A gate structure adapted for mains of large diameter comprising a casing having opposing inlet and outlet fluid pipes axially alined, said outlet pipe having a gate seat inclined to the plane of travel of the gate, a gate vertically movable within the casing between said pipes and having a portion adapted to coact with said seat to close the structure, said gate embodying a relatively thin wall curved to approximate a convex face adapted to oppose the flow of fluid, said face being supported by webs leading from the seating side of the gate, said inlet pipe being open to the casing when the gate is closed.

7. A gate structure comprising a casing having opposed inlet and outlet fluid pipes extending thereinto, with the outlet pipe having a gate seat, diametrically opposed guides extending vertically within the casing, a gate movable vertically within said guides and having an annular portion adapted to coact with said seat to close the structure, said gate having its inlet face curved to approximate a convex surface.

In testimony whereof I affix my signature in presence of two witnesses.

ROBERT L. HIBBARD. [L. S.]

Witnesses:
J. L. HOFNER,
ADA M. STEELE.